United States Patent
Oliveti et al.

(10) Patent No.: US 12,051,549 B2
(45) Date of Patent: Jul. 30, 2024

(54) COAXIAL VARIABLE CAPACITOR

(71) Applicant: COMET TECHNOLOGIES USA, INC., San Jose, CA (US)

(72) Inventors: Anthony Oliveti, San Jose, CA (US); Tigran Poghosyan, San Jose, CA (US)

(73) Assignee: COMET TECHNOLOGIES USA, INC., San Jose, CA (US)

( * ) Notice: Subject to any disclaimer, the term of this patent is extended or adjusted under 35 U.S.C. 154(b) by 211 days.

(21) Appl. No.: 17/879,317

(22) Filed: Aug. 2, 2022

(65) Prior Publication Data
US 2024/0047139 A1    Feb. 8, 2024

(51) Int. Cl.
| | |
|---|---|
| *H01T 23/00* | (2006.01) |
| *H01G 5/013* | (2006.01) |
| *H01G 5/014* | (2006.01) |
| *H01G 5/16* | (2006.01) |

(52) U.S. Cl.
CPC ............. *H01G 5/16* (2013.01); *H01G 5/0132* (2013.01); *H01G 5/014* (2013.01)

(58) Field of Classification Search
None
See application file for complete search history.

(56) References Cited

U.S. PATENT DOCUMENTS

| | | | |
|---|---|---|---|
| 4,177,495 A * | 12/1979 | Perret | H01G 5/14 361/278 |
| 4,679,007 A | 7/1987 | Reese et al. | |
| 5,175,472 A | 12/1992 | Johnson, Jr. et al. | |
| 5,195,045 A | 3/1993 | Keane et al. | |
| 5,394,061 A | 2/1995 | Fujii | |

(Continued)

FOREIGN PATENT DOCUMENTS

| | | |
|---|---|---|
| CN | 212342477 U | 1/2021 |
| JP | 04239211 A | 8/1992 |

(Continued)

OTHER PUBLICATIONS

PCT/US2023/071327 International Search Report and Written Opinion of the International Searching Authority, dated Nov. 20, 2023, 8 pages.

(Continued)

*Primary Examiner* — Stephen W Jackson
(74) *Attorney, Agent, or Firm* — Nolte Lackenbach Siegel

(57) ABSTRACT

A variable capacitor includes first and second movable capacitor plate assemblies disposed in the interior of an enclosure and include a first and second movable capacitor plates. A first fixed capacitor plate and a second fixed capacitor plate are respectively disposed proximal to the first and second movable capacitor plates. The capacitor plates may comprise variably interdigitated concentric cylindrical blades. The first movable capacitor plate and the first fixed capacitor plate may be coaxial with the second movable capacitor plate and the second fixed capacitor plate. Actuators may be provided for independently advancing and retracting the first and second movable capacitor plate assemblies with respect to the first and second fixed capacitor plate assemblies to vary the capacitance of the variable capacitor by independently adjusting an amount of interdigitization of the capacitor plates of respective capacitor plate assembly pairs.

21 Claims, 10 Drawing Sheets

(56) References Cited

U.S. PATENT DOCUMENTS

| | | | |
|---|---|---|---|
| 5,474,648 A | 12/1995 | Patrick et al. | |
| 5,576,629 A | 11/1996 | Turner et al. | |
| 5,609,737 A | 3/1997 | Fukui et al. | |
| 5,629,653 A | 5/1997 | Stimson | |
| 5,737,175 A | 4/1998 | Grosshart et al. | |
| 5,792,261 A | 8/1998 | Hama et al. | |
| 5,810,963 A | 9/1998 | Tomioka | |
| 5,842,154 A | 11/1998 | Harnett et al. | |
| 5,849,136 A | 12/1998 | Mintz et al. | |
| 5,866,869 A | 2/1999 | Schneider | |
| 5,889,252 A | 3/1999 | Williams et al. | |
| 5,910,886 A | 6/1999 | Coleman | |
| 5,914,974 A | 6/1999 | Partlo | |
| 6,016,131 A | 1/2000 | Sato et al. | |
| 6,157,179 A | 12/2000 | Miermans | |
| 6,164,241 A | 12/2000 | Chen et al. | |
| 6,252,354 B1 | 6/2001 | Collins et al. | |
| 6,268,995 B1 * | 7/2001 | Beuerman | H01G 5/00 361/278 |
| 6,313,584 B1 | 11/2001 | Johnson et al. | |
| 6,313,587 B1 | 11/2001 | MacLennan et al. | |
| 6,326,597 B1 | 12/2001 | Lubomirsky et al. | |
| 6,407,648 B1 | 6/2002 | Johnson | |
| 6,455,437 B1 | 9/2002 | Davidow et al. | |
| 6,463,875 B1 | 10/2002 | Chen et al. | |
| 6,507,155 B1 | 1/2003 | Barnes et al. | |
| 6,677,828 B1 | 1/2004 | Harnett et al. | |
| 6,703,080 B2 | 3/2004 | Reyzelman | |
| 6,806,437 B2 | 10/2004 | Oh | |
| 6,876,155 B2 | 4/2005 | Howald et al. | |
| 6,894,245 B2 | 5/2005 | Hoffman | |
| 6,949,887 B2 | 9/2005 | Kirkpatrick et al. | |
| 7,030,335 B2 | 4/2006 | Hoffman | |
| 7,042,311 B1 | 5/2006 | Hilliker et al. | |
| 7,079,597 B1 | 7/2006 | Kenwood | |
| 7,102,292 B2 | 9/2006 | Parsons et al. | |
| 7,192,505 B2 | 3/2007 | Roche et al. | |
| 7,196,283 B2 | 3/2007 | Buchberger, Jr. | |
| 7,215,697 B2 | 5/2007 | Hill et al. | |
| 7,220,937 B2 | 5/2007 | Hoffman | |
| 7,251,121 B2 | 7/2007 | Bhutta | |
| 7,259,623 B2 | 8/2007 | Coleman | |
| 7,298,128 B2 | 11/2007 | Bhutta | |
| 7,467,612 B2 | 12/2008 | Suckewer | |
| 7,514,936 B2 | 4/2009 | Anwar | |
| 7,795,877 B2 | 9/2010 | Radtke | |
| 7,796,368 B2 | 9/2010 | Kotani | |
| 8,169,162 B2 | 5/2012 | Yuzurihara | |
| 8,203,372 B2 | 6/2012 | Arduini | |
| 8,222,822 B2 | 7/2012 | Gilbert | |
| 8,421,377 B2 | 4/2013 | Kirchmeier | |
| 8,466,622 B2 | 6/2013 | Knaus | |
| 8,471,746 B2 | 6/2013 | Kurunezi et al. | |
| 8,491,759 B2 | 7/2013 | Pipitone et al. | |
| 8,742,669 B2 | 6/2014 | Carter et al. | |
| 8,779,662 B2 | 7/2014 | Boston | |
| 8,803,424 B2 | 8/2014 | Boston | |
| 8,884,180 B2 | 11/2014 | Ilie | |
| 8,896,391 B2 | 11/2014 | du Toit | |
| 8,928,229 B2 | 1/2015 | Boston | |
| 9,042,121 B2 | 5/2015 | Walde et al. | |
| 9,065,426 B2 | 6/2015 | Mason et al. | |
| 9,105,447 B2 | 8/2015 | Brouk et al. | |
| 9,111,725 B2 | 8/2015 | Boston | |
| 9,124,248 B2 | 9/2015 | Van Zyl et al. | |
| 9,142,388 B2 | 9/2015 | Hoffman et al. | |
| 9,148,086 B2 | 9/2015 | Fife et al. | |
| 9,166,481 B1 | 10/2015 | Vinciarelli | |
| 9,171,700 B2 | 10/2015 | Gilmore | |
| 9,196,459 B2 | 11/2015 | Bhutta | |
| 9,208,992 B2 | 12/2015 | Brouk et al. | |
| 9,224,579 B2 | 12/2015 | Finley et al. | |
| 9,225,299 B2 | 12/2015 | Mueller et al. | |
| 9,287,098 B2 | 3/2016 | Finley et al. | |
| 9,294,100 B2 | 3/2016 | Van Zyl et al. | |
| 9,306,533 B1 | 4/2016 | Mavretic | |
| 9,313,870 B2 | 4/2016 | Walde et al. | |
| 9,337,804 B2 | 5/2016 | Mason et al. | |
| 9,345,122 B2 | 5/2016 | Bhutta | |
| 9,385,021 B2 | 7/2016 | Chen | |
| 9,418,822 B2 | 8/2016 | Kaneko | |
| 9,478,397 B2 | 10/2016 | Blackburn et al. | |
| 9,483,066 B2 | 11/2016 | Finley et al. | |
| 9,490,353 B2 | 11/2016 | Van Zyl et al. | |
| 9,496,122 B1 | 11/2016 | Bhutta | |
| 9,520,269 B2 | 12/2016 | Finley et al. | |
| 9,524,854 B2 | 12/2016 | Hoffman et al. | |
| 9,525,412 B2 | 12/2016 | Mavretic | |
| 9,536,713 B2 | 1/2017 | Van Zyl et al. | |
| 9,543,122 B2 | 1/2017 | Bhutta | |
| 9,544,987 B2 | 1/2017 | Mueller et al. | |
| 9,558,917 B2 | 1/2017 | Finley et al. | |
| 9,577,516 B1 | 2/2017 | Van Zyl et al. | |
| 9,584,090 B2 | 2/2017 | Mavretic | |
| 9,578,731 B2 | 3/2017 | Hoffman et al. | |
| 9,591,739 B2 | 3/2017 | Bhutta | |
| 9,589,767 B2 | 4/2017 | Finley et al. | |
| 9,620,340 B2 | 4/2017 | Finley et al. | |
| 9,651,957 B1 | 5/2017 | Finley et al. | |
| 9,660,613 B2 | 5/2017 | Van Zyl et al. | |
| 9,673,028 B2 | 6/2017 | Walde et al. | |
| 9,697,911 B2 | 7/2017 | Bhutta | |
| 9,711,331 B2 | 7/2017 | Mueller et al. | |
| 9,711,335 B2 | 7/2017 | Christie et al. | |
| 9,728,378 B2 | 8/2017 | Bhutta et al. | |
| 9,729,122 B2 | 8/2017 | Mavretic | |
| 9,741,544 B2 | 8/2017 | Van Zyl et al. | |
| 9,745,660 B2 | 8/2017 | Bhutta | |
| 9,748,076 B1 | 8/2017 | Choi et al. | |
| 9,755,641 B1 | 9/2017 | Bhutta | |
| 9,773,644 B2 | 9/2017 | Van Zyl et al. | |
| 9,807,863 B1 | 10/2017 | Van Zyl et al. | |
| 9,812,305 B2 | 11/2017 | Pelleymounter et al. | |
| 9,844,127 B2 | 12/2017 | Bhutta | |
| 9,852,890 B2 | 12/2017 | Mueller et al. | |
| 9,854,659 B2 | 12/2017 | Van Zyl et al. | |
| 9,865,432 B1 | 1/2018 | Bhutta | |
| 9,952,297 B2 | 4/2018 | Wang | |
| 10,008,317 B2 | 6/2018 | Iyer | |
| 10,020,752 B1 | 7/2018 | Vinciarelli | |
| 10,026,592 B2 | 7/2018 | Chen | |
| 10,026,594 B2 | 7/2018 | Bhutta | |
| 10,026,595 B2 | 7/2018 | Choi et al. | |
| 10,074,518 B2 | 9/2018 | Van Zyl et al. | |
| 10,139,285 B2 | 11/2018 | Murray et al. | |
| 10,141,788 B2 | 11/2018 | Kamstedt | |
| 10,194,518 B2 | 1/2019 | Van Zyl et al. | |
| 10,217,618 B2 | 2/2019 | Larson et al. | |
| 10,224,184 B2 | 3/2019 | Van Zyl et al. | |
| 10,224,186 B2 | 3/2019 | Polak et al. | |
| 10,263,577 B2 | 4/2019 | Van Zyl et al. | |
| 10,269,540 B1 | 4/2019 | Carter et al. | |
| 10,314,156 B2 | 6/2019 | Van Zyl et al. | |
| 10,332,730 B2 | 6/2019 | Christie et al. | |
| 10,340,879 B2 | 7/2019 | Mavretic | |
| 10,373,811 B2 | 8/2019 | Christie et al. | |
| 10,374,070 B2 | 8/2019 | Wood | |
| 10,410,836 B2 | 9/2019 | McChesney | |
| 10,411,769 B2 | 9/2019 | Bae | |
| 10,447,174 B1 | 10/2019 | Porter, Jr. et al. | |
| 10,469,108 B2 | 11/2019 | Howald | |
| 10,475,622 B2 | 11/2019 | Pankratz et al. | |
| 11,657,980 B1 * | 5/2023 | Poghosyan | H01G 5/013 361/278 |
| 2003/0121609 A1 | 7/2003 | Ohmi et al. | |
| 2003/0150710 A1 | 8/2003 | Evans et al. | |
| 2003/0230984 A1 | 12/2003 | Kitamura et al. | |
| 2004/0016402 A1 | 1/2004 | Walther et al. | |
| 2004/0026235 A1 | 2/2004 | Stowell, Jr. | |
| 2005/0034811 A1 | 2/2005 | Mahoney et al. | |
| 2005/0045475 A1 | 3/2005 | Wantanabe | |
| 2005/0270805 A1 | 12/2005 | Yasumura | |
| 2006/0005928 A1 | 1/2006 | Howald | |
| 2006/0169582 A1 | 8/2006 | Brown et al. | |

(56) References Cited

U.S. PATENT DOCUMENTS

| | | |
|---|---|---|
| 2006/0169584 A1 | 8/2006 | Brown et al. |
| 2006/0249729 A1 | 11/2006 | Mundt et al. |
| 2007/0121267 A1 | 5/2007 | Kotani |
| 2007/0222428 A1 | 9/2007 | Garvin et al. |
| 2008/0061793 A1 | 3/2008 | Anwar et al. |
| 2008/0061901 A1 | 3/2008 | Gilmore |
| 2008/0087381 A1 | 4/2008 | Shannon et al. |
| 2008/0197854 A1 | 8/2008 | Valcore et al. |
| 2008/0272875 A1 | 11/2008 | Huang et al. |
| 2008/0317974 A1 | 12/2008 | de Vries |
| 2009/0026964 A1 | 1/2009 | Knaus |
| 2009/0206974 A1 | 8/2009 | Meinke |
| 2010/0012029 A1 | 1/2010 | Forester et al. |
| 2010/0072172 A1 | 3/2010 | Ui et al. |
| 2010/0096261 A1 | 4/2010 | Hoffman et al. |
| 2010/0098882 A1 | 4/2010 | Lubomirsky et al. |
| 2010/0159120 A1 | 6/2010 | Dzengeleski et al. |
| 2011/0121735 A1 | 5/2011 | Penny |
| 2011/0140607 A1 | 6/2011 | Moore et al. |
| 2011/0148303 A1 | 6/2011 | Van Zyl et al. |
| 2011/0174777 A1 | 7/2011 | Jensen et al. |
| 2012/0097104 A1 | 4/2012 | Pipitone et al. |
| 2012/0097524 A1 | 4/2012 | Pipitone et al. |
| 2012/0145322 A1 | 6/2012 | Gushiken et al. |
| 2012/0164834 A1 | 6/2012 | Jennings et al. |
| 2012/0262064 A1 | 10/2012 | Nagarkatti |
| 2013/0002136 A1 | 1/2013 | Blackburn et al. |
| 2013/0140984 A1 | 6/2013 | Hirayama |
| 2013/0180964 A1 | 7/2013 | Ilic |
| 2013/0214683 A1 | 8/2013 | Valcore et al. |
| 2013/0240482 A1 | 9/2013 | Nam et al. |
| 2013/0278140 A1 | 10/2013 | Mudunuri et al. |
| 2013/0345847 A1 | 12/2013 | Valcore et al. |
| 2014/0225504 A1 | 8/2014 | Kaneko |
| 2014/0239813 A1 | 8/2014 | Van Zyl |
| 2014/0265911 A1 | 9/2014 | Kamata et al. |
| 2014/0328027 A1 | 11/2014 | Zhang et al. |
| 2014/0367043 A1 | 12/2014 | Bishara et al. |
| 2015/0002020 A1 | 1/2015 | Boston |
| 2015/0115797 A1 | 4/2015 | Yuzurihara |
| 2015/0150710 A1 | 6/2015 | Evans et al. |
| 2015/0313000 A1 | 10/2015 | Thomas et al. |
| 2016/0002020 A1 | 1/2016 | Orita |
| 2016/0248396 A1 | 8/2016 | Mavretic |
| 2016/0308560 A1 | 10/2016 | Howald et al. |
| 2017/0018349 A1 | 1/2017 | Otsubo et al. |
| 2017/0133886 A1 | 5/2017 | Kurs et al. |
| 2017/0338081 A1 | 11/2017 | Yamazawa |
| 2017/0345620 A1 | 11/2017 | Coumou et al. |
| 2018/0034446 A1 | 1/2018 | Wood |
| 2018/0102238 A1 | 4/2018 | Gu et al. |
| 2018/0261431 A1 | 9/2018 | Hammond, IV |
| 2019/0172683 A1 | 6/2019 | Mavretic |
| 2019/0199241 A1 | 6/2019 | Satoshi et al. |
| 2019/0385822 A1 | 12/2019 | Marakhtanov et al. |
| 2020/0058441 A1 | 2/2020 | Altenhoven et al. |
| 2021/0398746 A1 | 12/2021 | Fasel et al. |

FOREIGN PATENT DOCUMENTS

| | | |
|---|---|---|
| JP | 05284046 A | 8/1993 |
| JP | 2006-310245 A | 6/2008 |
| JP | 2010-016124 A | 1/2010 |
| JP | 2015-502213 A | 1/2015 |
| KR | 10-2006-0067957 A | 6/2006 |
| KR | 10-2014-0077866 A | 6/2014 |
| KR | 10-2017-0127724 A | 11/2017 |
| KR | 10-2018-0038596 A | 4/2018 |
| WO | 2012054305 | 4/2012 |
| WO | 2012054306 | 4/2012 |
| WO | 2012054307 | 4/2012 |
| WO | 2016048449 A1 | 3/2016 |
| WO | 2016097730 | 6/2016 |
| WO | 2016-122174 A1 | 8/2016 |
| WO | 2019096564 A1 | 5/2019 |
| WO | 2019147513 A1 | 8/2019 |
| WO | 2019-244734 A1 | 12/2019 |

OTHER PUBLICATIONS

PCT/US2018/062951—International Search Report and Written Opinion of International Searching Authority, dated Aug. 28, 2019, 10 pages.

Stowell, et al., "RF-superimposed DC and pulsed DC sputtering for deposition of transparent conductive oxides", Thin Solid Films 515 (2007), pp. 7654-7657.

Bender, et al., "Characterization of a RF=dc-magnetron discharge for the sputter deposition of transparent and highly conductive ITO films", Appl. Phys. A 69, (1999), pp. 397-409.

Economou, Demetre J., "Fundamentals and application of ion-ion plasmas", Applied Surface Science 253 (2007), pp. 6672-6680.

Godyak et al., "Plasma parameter evolution in a periodically pulsed ICP", XXVIIth, Eindhoven, the Netherlands, Jul. 18-22, 2005, 4 pages.

Banna, et al., "Inductively Coupled Pulsed Plasmas in the Presence of Synchronous Pulsed Substrate Bias for Robust, Reliable, and Fine Conductor Etching", IEEE Transactions on Plasma Science, vol. 37, No. 9, Sep. 2009, pp. 1730-1746.

Kushner, Mark J., "Pulsed Plasmas as a Method to Improve Uniformity During Materials Processing", Journal of Applied Physics, Jul. 1, 2004, vol. 96, No. 1, pp. 82-93.

LTM Technologies, M. Haass "Synchronous Plasma Pulsing for Etch Applications", Apr. 3, 2010 16 pages.

PCT/US2020/038892—International Search Report and Written Opinion of the International Searching Authority, dated Oct. 6, 2020, 3 pages.

PCT/US2020/038899—International Search Report and Written Opinion of the International Searching Authority, dated Sep. 26, 2019, 5 pages.

PCT/US2021/012847—International Search Report and Written Opinion of the International Searching Authority, dated May 6, 2021, 11 pages.

PCT/US2021/012849 International Search Report and Written Opinion of the International Searching Authority, dated May 10, 2021, 11 pages.

PCT/US2021/012851 International Search Report and Written Opinion of the International Searching Authority, dated May 6, 2021, 10 pages.

\* cited by examiner

COAXIAL VARIABLE CAPACITOR

CROSS-REFERENCE TO RELATED APPLICATION

This application is related to previously-filed U.S. patent application Ser. No. 17/739,595, filed in the name of Tigran Poghosyan, Anthony Oliveti, Gabe Calebotta, and Kirkwood Rough, and entitled "DIELECTRIC FLUID VARIABLE CAPACITOR," which application is hereby incorporated by reference herein for all purposes.

This application is also related to previously-filed U.S. patent application Ser. No. 17/739,745 filed in the name of Tigran Poghosyan and Anthony Oliveti, and entitled "VARIABLE CAPACITOR WITH LINEAR IMPEDANCE AND HIGH VOLTAGE BREAKDOWN," which application is hereby incorporated by reference herein.

BACKGROUND

Variable capacitors are used in a variety of applications, particularly those involving high frequency, high power signals. Variable capacitors may be utilized, for example, in oscillation circuits for high-power radio transmission, high-frequency power supplies for semiconductor manufacturing equipment, and impedance matching networks in which the impedance of a time-dependent, high-frequency load is to be matched with that of a generator.

A capacitor consists essentially of at least two spaced-apart capacitor plates with an insulator or dielectric material disposed between the capacitor plates. As used herein, the terms "dielectric," "dielectric material" and "dielectric medium" are interchangeably used to refer to a material (i.e., solid, liquid, or gas) which is polarizable in the presence of an electric field, typically expressed in terms of the material's electrical susceptibility x.

In a vacuum variable capacitor, the at least two capacitor plates are maintained in a high vacuum, (e.g., $10^{-6}$ Torr or less) which serves as the capacitor's dielectric, having a susceptibility $\chi \approx 0$. In some vacuum variable capacitors, the capacitor plates may be configured as a plurality of interdigitated, concentric plates, and the variability of capacitance may be achieved through physically adjusting the length of overlapping in the interdigitation.

In a liquid dielectric variable capacitor, such as disclosed in the above-referenced '595 application, a liquid dielectric is provided between the capacitor plates to serve as the dielectric. The liquid dielectric may improve thermal and capacitive performance of the variable capacitor.

BRIEF DESCRIPTION OF THE DRAWINGS

The present disclosure is best understood from the following detailed description when read with the accompanying figures, wherein.

Figure 1:
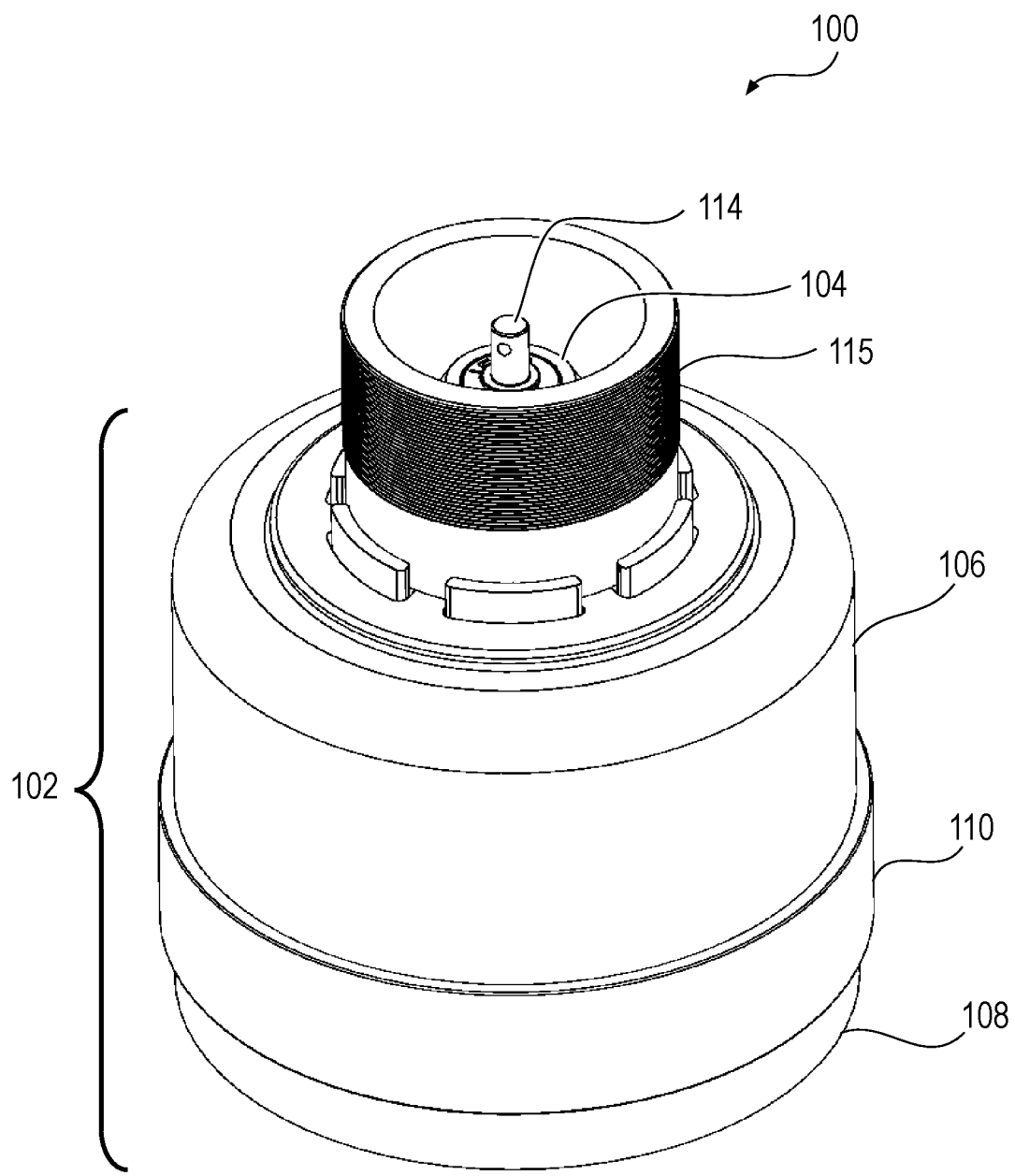
FIG. 1 is an external isometric view of a coaxial variable capacitor according to one or more examples.

It is emphasized that, in accordance with the standard practice in the industry, various features are not drawn to scale. In fact, the dimensions of the various features may be arbitrarily increased or reduced for clarity of discussion or illustration.

DETAILED DESCRIPTION

Illustrative examples of the subject matter claimed below are disclosed. In the interest of clarity, not all features of an actual implementation are described for every example in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The expressions such as "include" and "may include" which may be used in the present disclosure denote the presence of the disclosed functions, operations, and constituent elements, and do not limit the presence of one or more additional functions, operations, and constituent elements. In the present disclosure, terms such as "include" and/or "have", may be construed to denote a certain characteristic, number, operation, constituent element, component or a combination thereof, but should not be construed to exclude the existence of or a possibility of the addition of one or more other characteristics, numbers, operations, constituent elements, components or combinations thereof.

As used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

As used herein, to "provide" an item means to have possession of and/or control over the item. This may include, for example, forming (or assembling) some or all of the item from its constituent materials and/or, obtaining possession of and/or control over an already-formed item.

As used herein, "coaxial" refers to a relationship between two structures having coincident axes, such as a first cylindrical structure surrounding a second cylindrical structure each having the same axis.

Unless otherwise defined, all terms including technical and/or scientific terms used herein have the same meaning as commonly understood by one of ordinary skill in the art to which the present disclosure pertains. In addition, unless otherwise defined, all terms defined in generally used dictionaries may not be overly interpreted.

The subject matter described herein is directed to examples of coaxial variable capacitors as well as coaxial variable capacitors incorporating a liquid dielectric material between capacitor plates. In the latter examples, the liquid dielectric material may increase the effective maximum capacitance of the variable capacitor for a given capacitor plate geometry. The liquid dielectric material may further increase the electrical breakdown voltage of the capacitor for a given capacitor plate geometry. The liquid dielectric material may further provide for additional dissipation of thermal energy within the variable capacitor relative to, for example, a coaxial capacitor, owing to the potential of a liquid dielectric having a greater thermal conductivity than a vacuum.

FIG. 1 is an external isometric view of a coaxial variable capacitor 100 according to one or more examples. Coaxial variable capacitor 100 includes an enclosure 102 with an actuator end cap 104 as hereinafter described. In the example of FIG. 1, enclosure 102 includes a top conductive collar 106 and a bottom contact assembly 108 electrically insulated from one another by an intermediate cylindrical insulator 110 joined in a hermetic manner to top conductive collar 106 and bottom contact assembly 108. In examples, conductive collars 106 and 108 may be a metal such as silver-plated copper, copper, brass, aluminum, or brazed aluminum. In examples, intermediate electrically insulating element 110 may be substantially cylindrical, and may be made of ceramic or another suitable insulating material. A threaded actuator 115 may surround actuator end cap 104.

An upper end of an actuator 114 extends out of actuator end cap 104. In some examples, actuator 114 may threaded, and may be rotated to advance and retract a movable capacitor assembly 124, relative to a fixed capacitor assembly 130, within enclosure 102, as hereinafter described. In other examples, actuator 114 may be advanced and retracted by means of a linear motor, an electromagnetic coil arrangement, or hydraulic or pneumatic systems. Similarly, a threaded actuator 115 may be actuated to advance and retract a movable capacitor assembly 122, relative to a fixed capacitor assembly 128, within enclosure 102, as hereinafter described.

Figure 2:
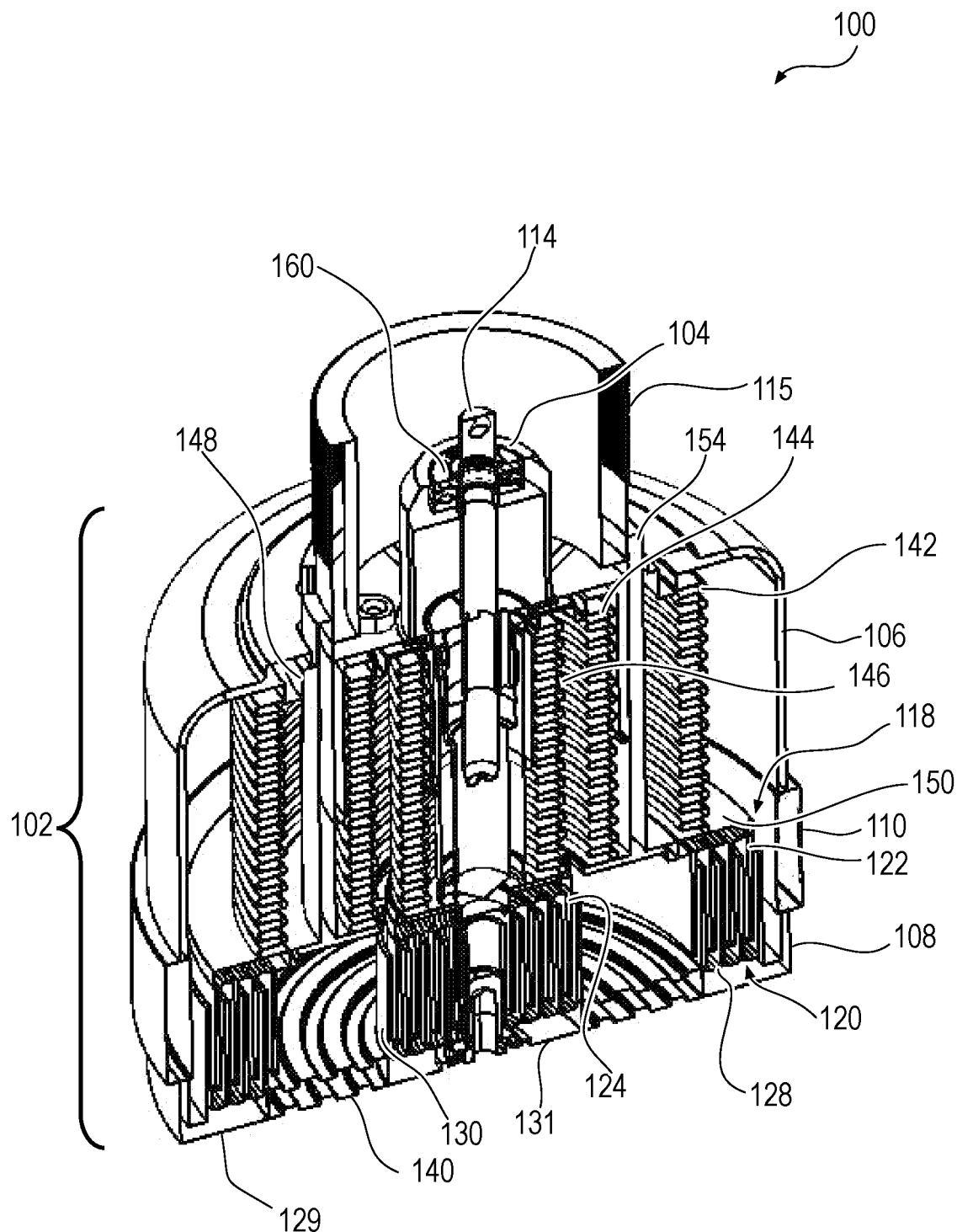
FIG. 2 is a cut-away isometric view of the coaxial vacuum variable capacitor of FIG. 1.

FIG. 2 is a cut-away isometric view of coaxial variable capacitor 100 according to one or more examples. FIGS. 3 and 4 are front cross-sectional views of coaxial variable capacitor 100, with a movable capacitor plate assembly 118 and a fixed capacitor plate assembly 120 contained within enclosure 102. Movable capacitor plate assembly 118 includes a first movable capacitor plate assembly 122 and a second movable capacitor plate assembly 124. Fixed capacitor plate assembly 120 includes a third capacitor plate assembly 128 and a fourth capacitor plate assembly 130. As described herein, in some examples, movable capacitor plate assembly 122 may move independently from movable capacitor plate assembly 124. A bottom surface 129 of third capacitor plate assembly 128 of fixed capacitor plate assembly 120 defines an outer, annular conductive contact of contact assembly 108. A bottom surface 131 of fourth capacitor plate assembly 130 defines an inner, annular conductive contact of contact assembly 108.

Figure 6:
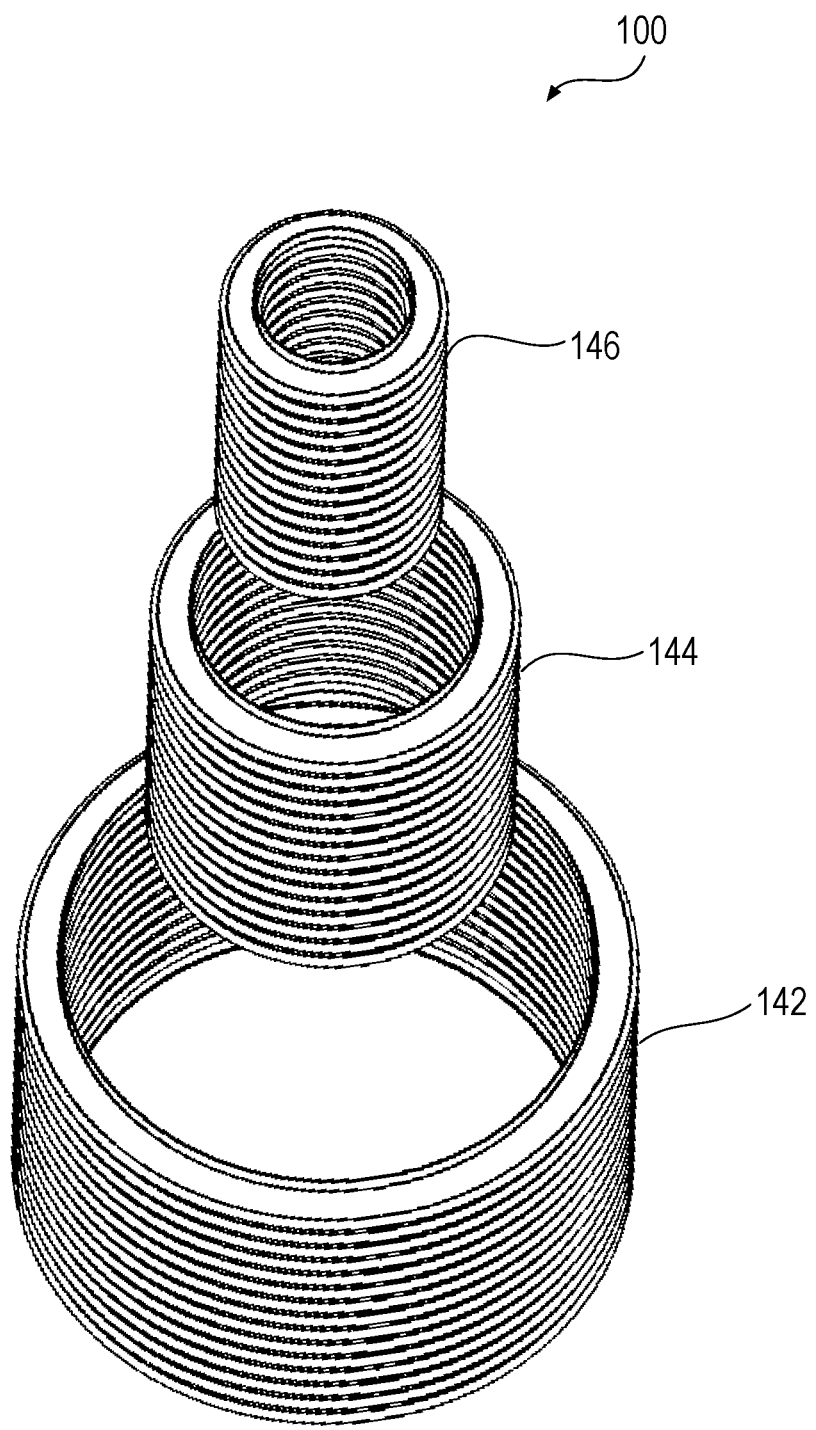
FIG. 6 is an exploded isometric view of a plurality of flexible structures in the coaxial variable capacitor of FIG. 1.

FIG. 4 is a cut-away, exploded isometric view of capacitor plate assemblies 122, 124, 128 and 130 in isolation. In examples, capacitor plate assemblies 122, 124, 128 and 130 each comprise a plurality of concentric cylindrical blades 132, 134, 136, and 138, respectively, and are maintained in a coaxial orientation within enclosure 102 such that the respective cylindrical blades 132 and 136 of capacitor plate assemblies 122 and 128 may interdigitate, and the respective cylindrical blades 134 and 138 of capacitor plate assemblies 124 and 128 may interdigitate. FIG. 6 is an enlarged cut-away exploded isometric view of capacitor plate assemblies 122 and 128 and their respective blades 132 and 138.

As illustrated in FIG. 2, fixed capacitor plate assembly 128 further includes an insulating ring 140 separating and electrically isolating capacitor plate assemblies 128 and 130. In examples, insulating ring 140 may be made of ceramic or other suitable insulative material.

In some examples (not depicted in the drawings herein) the heights of one or more of capacitor plates assemblies 122, 124, 126, and 128 may vary, such as from a maximum height at a central portion of the capacitor plate coil to a minimum height at an outer portion of the capacitor plate coil. (As used herein, the term "height" when describing a capacitor plate refers to the dimension of the capacitor plate extending away from a respective mounting plate.) Providing capacitor plates of varying heights may allow for the capacitance-versus-position curve for a pair of capacitor plates to more closely approximate a power function rather than a linear function, while also allowing the impedance-versus-position curve to more to more closely approximate a linear function rather than a power function. This concept is discussed in further detail in the above-referenced 745 application.

In examples, first and second capacitor plate assemblies 118 and 120 are configured so as to enable first capacitor plate assembly 122 to at least partially concentrically interdigitate with third capacitor plate assembly 128, and second capacitor plate assembly 124 to at least partially concentrically interdigitate with fourth capacitor plate assembly 130. In examples, first capacitor plate assembly 122 and third capacitor plate assembly 128 do not contact each other directly, nor does second capacitor plate assembly 124 directly connect fourth capacitor plate assembly 130.

The spacing between first capacitor plate assembly 122 and third capacitor plate assembly 128, as well as the spacing between second capacitor plate assembly 124 and fourth capacitor plate assembly 130 may be adjusted, as described herein, to vary the length of concentric, overlapping interdigitation between first capacitor plate 118 and third capacitor plate assembly 128, and between second capacitor plate assembly 124 and fourth capacitor plate assembly 130. As noted, the variations in spacing between first capacitor plate assembly 122 and third capacitor plate assembly 128 may be adjusted independently of the spacing between second capacitor plate assembly 124 and fourth capacitor plate assembly 130. That is, first capacitor plate assembly 122 may be raised or lowered relative to third capacitor plate assembly 128 independently of the raising or lowering of second capacitor plate assembly 124 relative to fourth capacitor plate 130. This variation in interdigitation of capacitor plate assembly pairs 122/128 and/or 124/130 thereby allows for adjustment of the effective capacitance of those capacitor plate assembly pairs 122/128 and 124/130. In examples, capacitor plate assemblies 122, 124, 128, and 130 may be made of materials (e.g., oxygen-free copper or copper-plated brass) conventionally used for such structures in a variable capacitor.

Figure 3A:
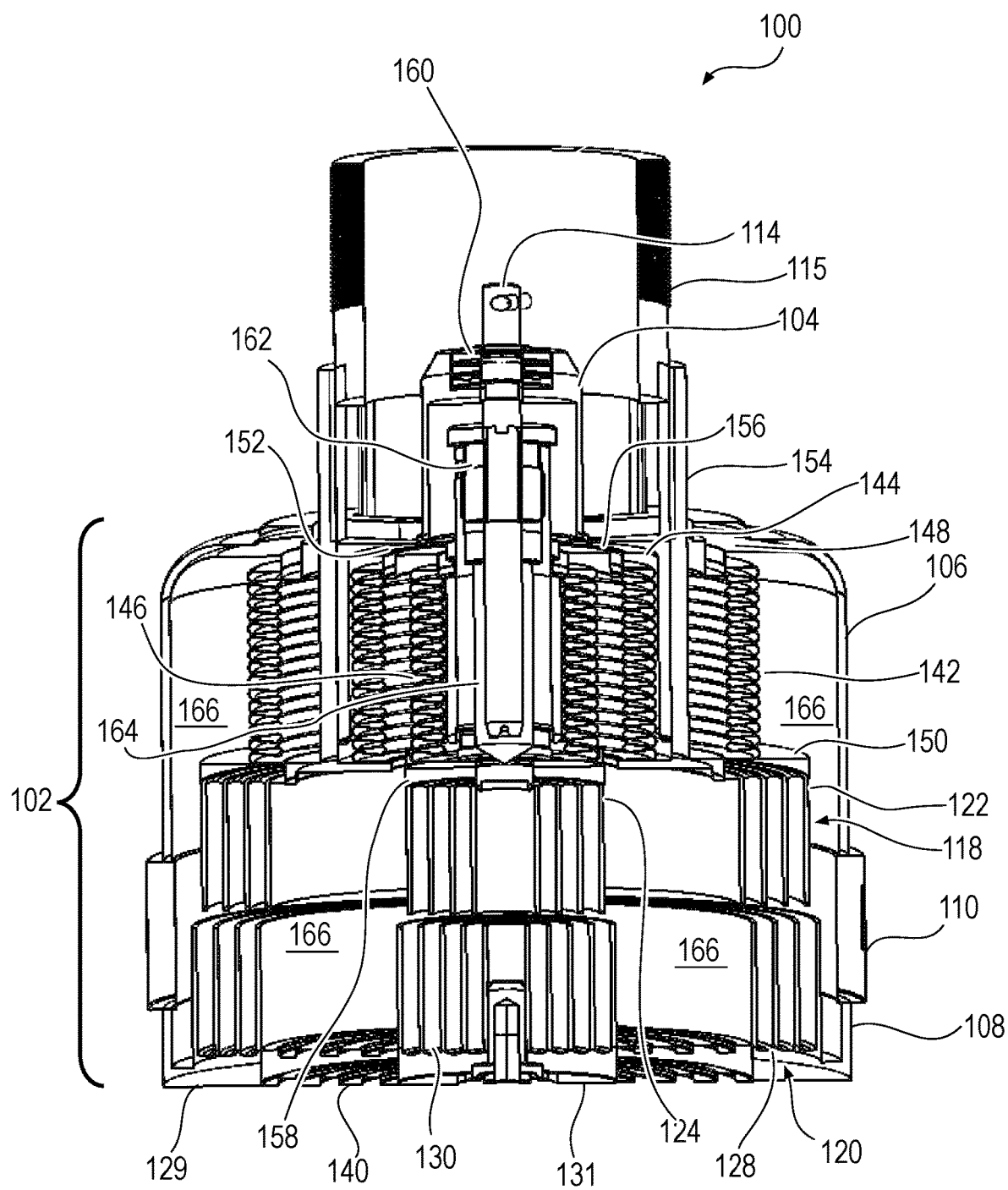
FIGS. 3A, 3B, 3C, and 3D are isometric, cross-sectional views of the vacuum variable capacitor of FIG. 1 with electrode plate assemblies in various relative positions.

FIGS. 3A, 3B, 3C, and 3D are isometric, cross-sectional views of coaxial variable capacitor 100 according to one or more examples, with capacitor plate assemblies 122, 124, 128, and 130 in various relative positions. In particular, FIG. 3A shows first (movable) capacitor plate assembly 122 raised to a maximum distance away from third (stationary) capacitor plate assembly 128, providing minimum capacitance between capacitor plate assemblies 122 and 128m and second (movable) capacitor plate assembly 124 raised to a maximum distance away from fourth (stationary) capacitor plate assembly 130, providing minimum capacitance between capacitor plate assemblies 124 and 130.

Figure 3B:
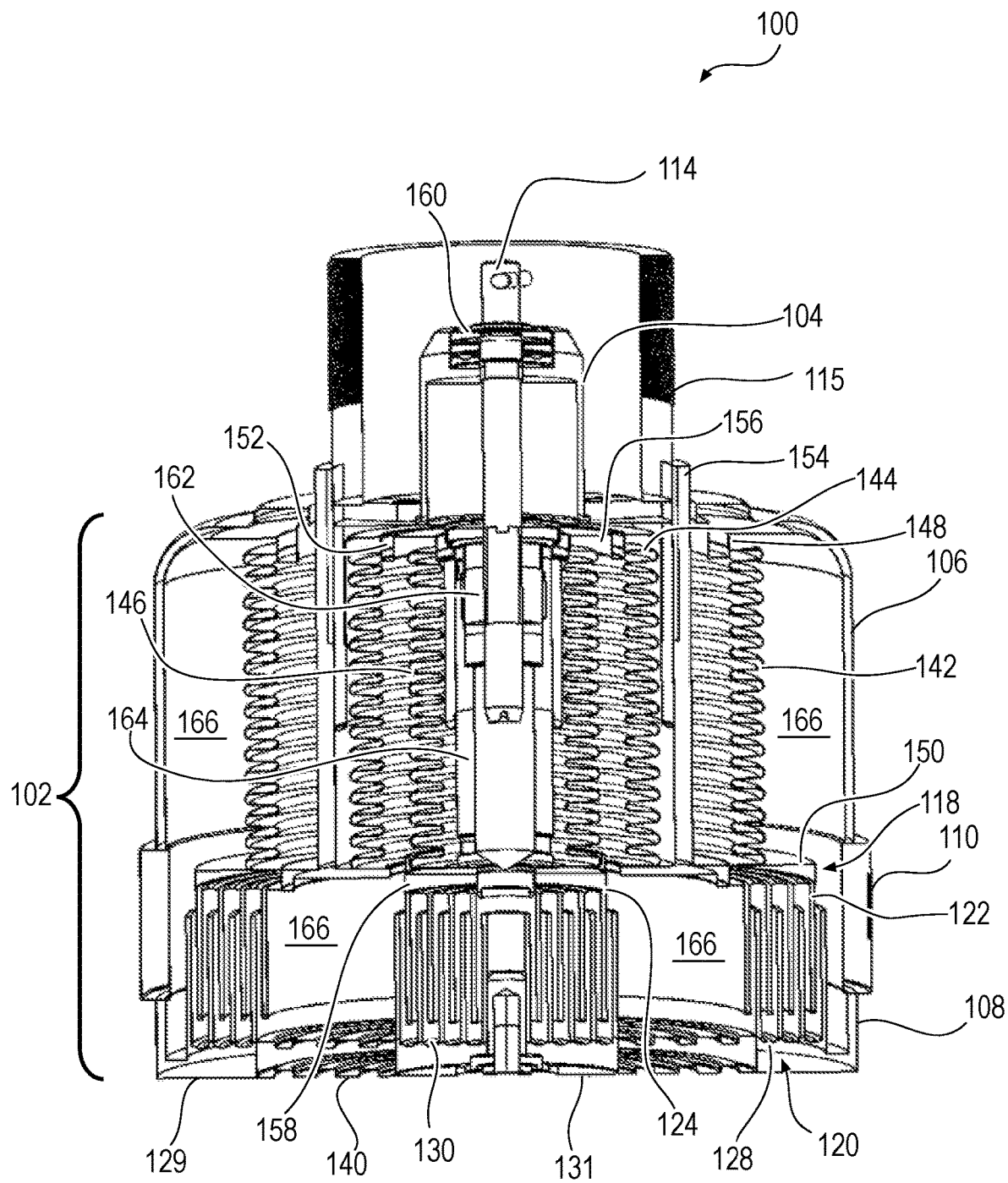
Figure 4:
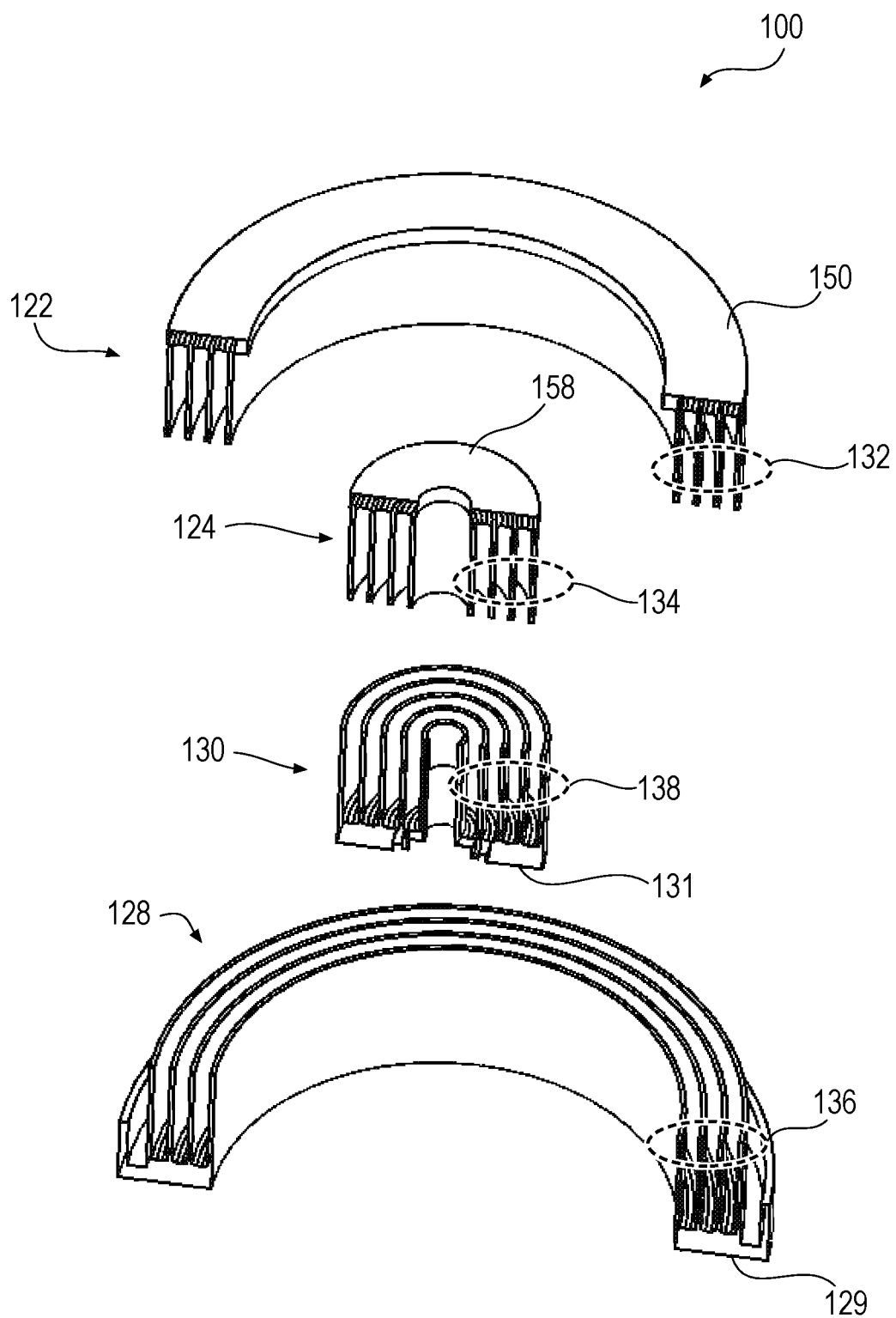
FIG. 4 is a cut-away isometric exploded view of first, second, third, and fourth capacitor plates of the coaxial vacuum variable capacitor of FIG. 1.
Figure 5:
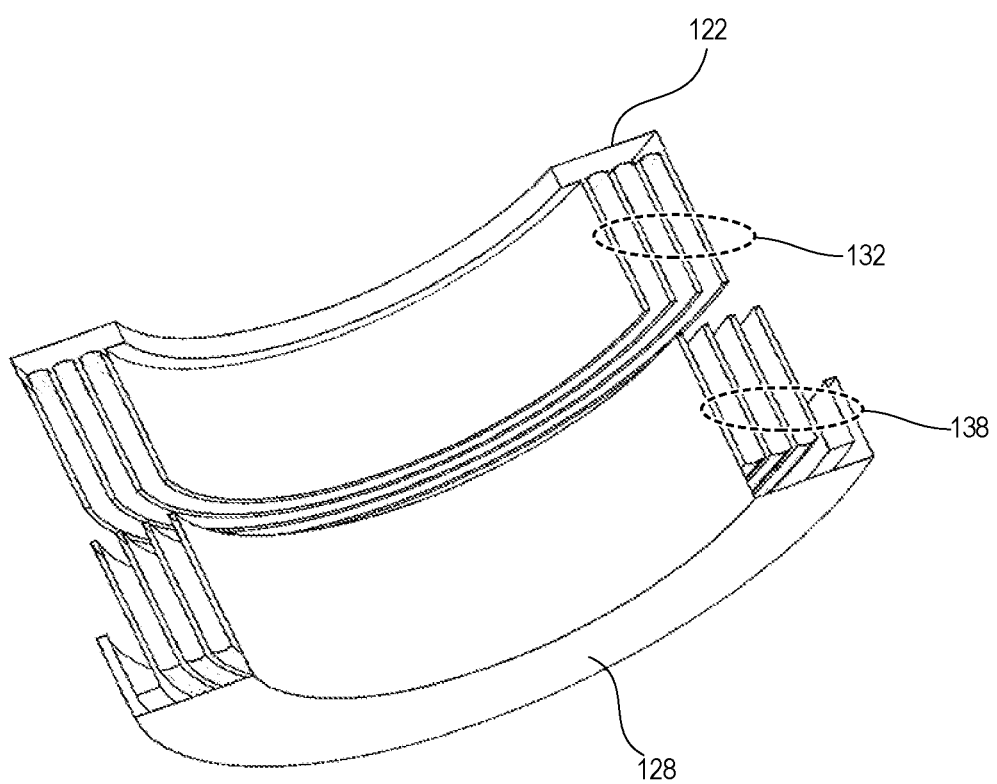
FIG. 5 is a cutaway isometric exploded view of concentric capacitor plates in the coaxial variable capacitor of FIG. 1.

FIG. 3B shows first (movable) capacitor plate assembly 122 lowered to a minimum distance away from third (stationary) capacitor plate assembly 128, providing a maximum capacitance between capacitor plate assemblies 122 and 128, and second (movable) capacitor plate assembly 124 lowered to a minimum distance away from fourth (stationary) capacitor plate assembly 130, providing maximum capacitance between capacitor plate assemblies 124 and 130.

Figure 3C:
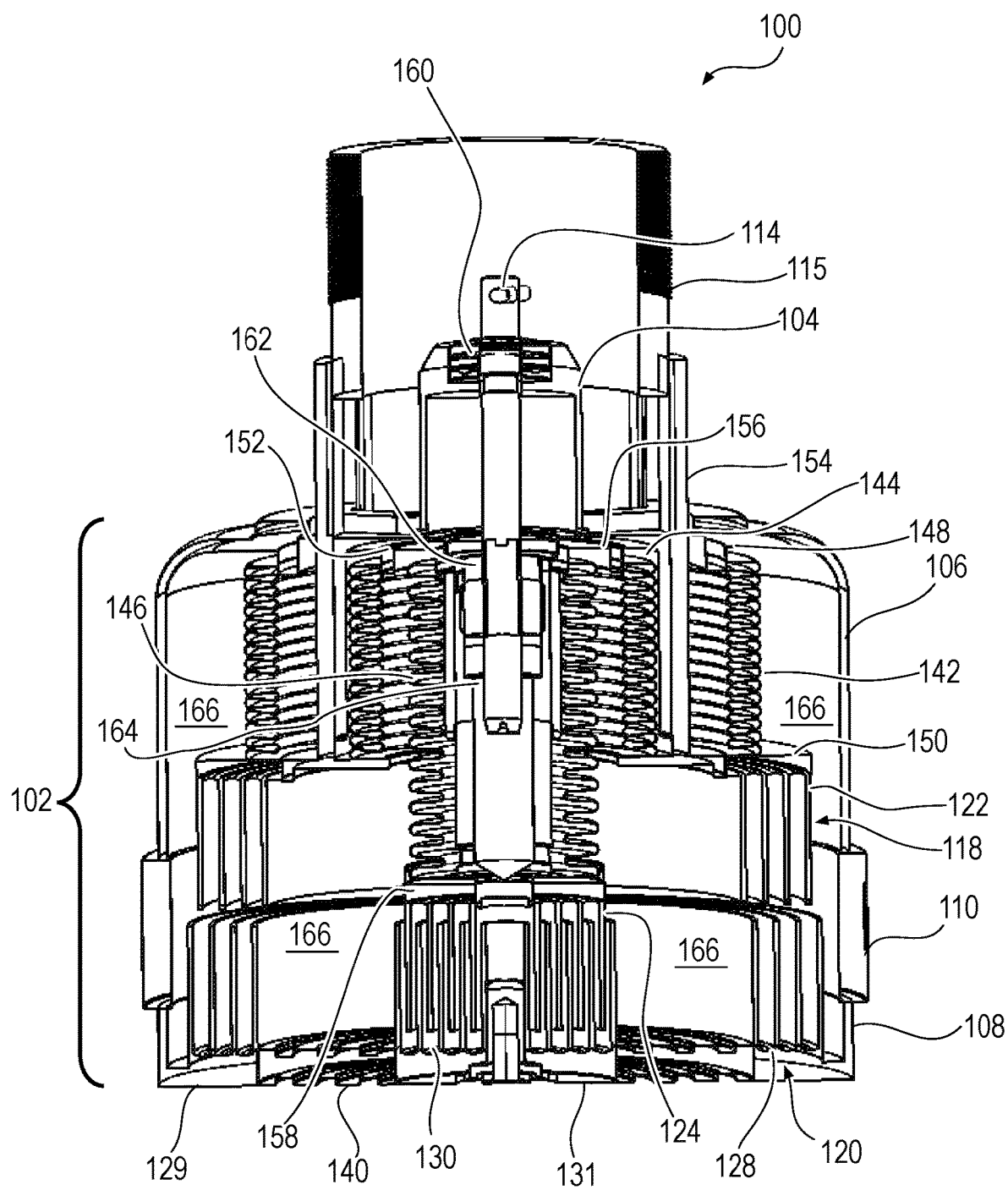

FIG. 3C shows first (movable) capacitor plate assembly 122 raised to its maximum distance away from third (stationary) capacitor plate assembly 128, providing a minimum capacitance therebetween, and second (movable) capacitor plate assembly 124 lowered to a minimum distance away from fourth (stationary) capacitor plate assembly 130, providing the maximum capacitance therebetween.

Figure 3D:
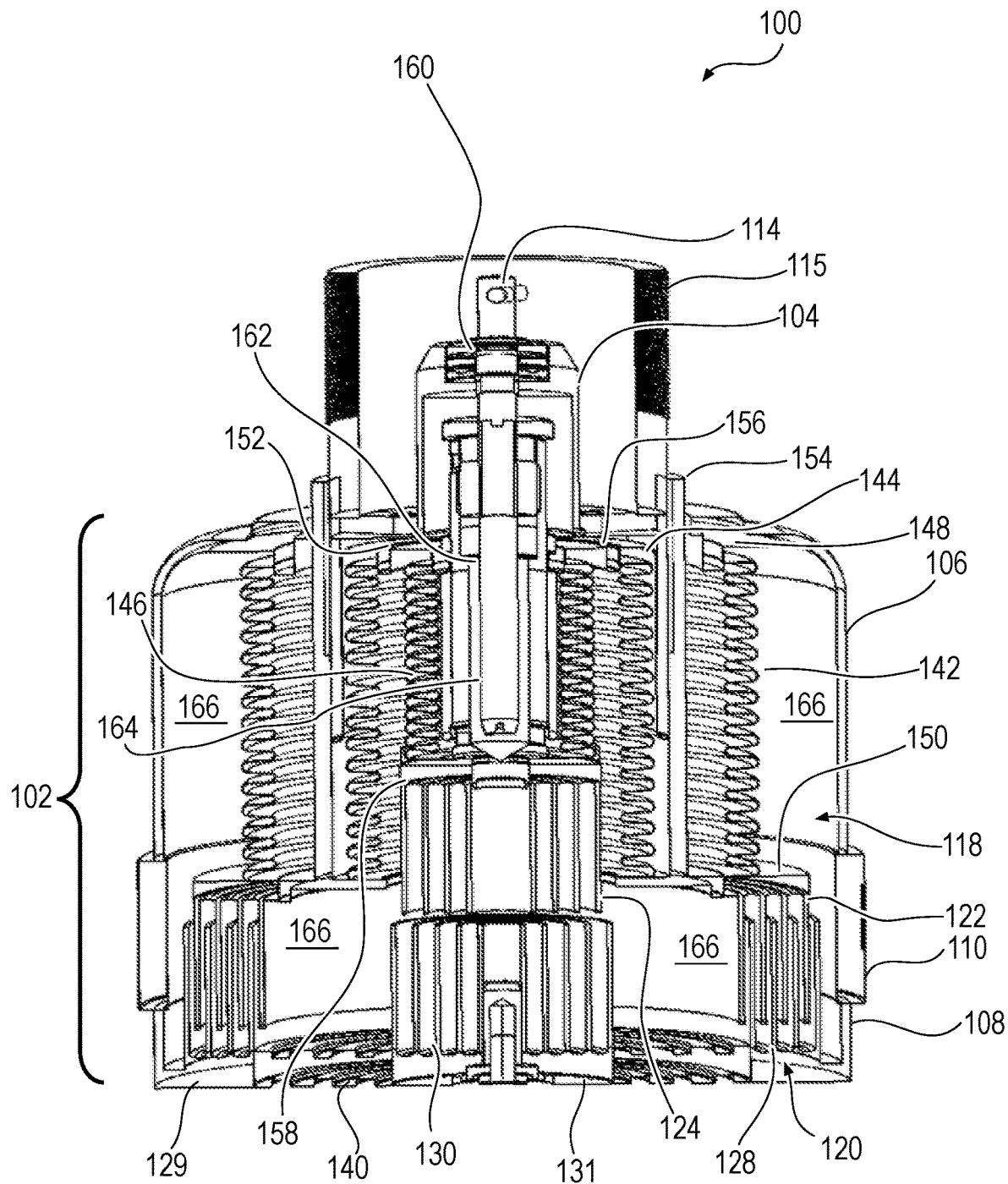

FIG. 3D shows first (movable) capacitor plate assembly 122 lowered to its minimum distance away from third (stationary) capacitor plate assembly 128, providing the maximum capacitance therebetween, and second (movable) capacitor plate assembly 124 raised to a maximum distance away from fourth (stationary) capacitor plate assembly 130, providing the minimum capacitance therebetween.

In various examples, the spacing between respective capacitor plate assembly pairs 122/128 and 124/130 may be independently adjusted to any intermediate distance between the extreme positions illustrated in FIGS. 3A-3D, allowing for an adjustable range of capacitances between capacitor plate assembly pairs 122/128 and 124/130.

With continued reference to FIGS. 2 and 3A-3D, and especially with reference to FIGS. 3A-3D, in one or more examples a plurality of flexible structures 142, 144, and 146 are in sealed attachment with top conductive collar 106 and various capacitor plate assemblies 122 and 124, as herein described. In various examples, such as depicted in FIGS. 2-4, flexible structures 142, 144, and 146 comprise compressible bellows structures. In various examples, flexible structures 142 144, and 146 may be made of conductive material, in order to provide conductive paths between capacitor plate assemblies 122 and 124 and top conductive collar 106.

Figure 7:
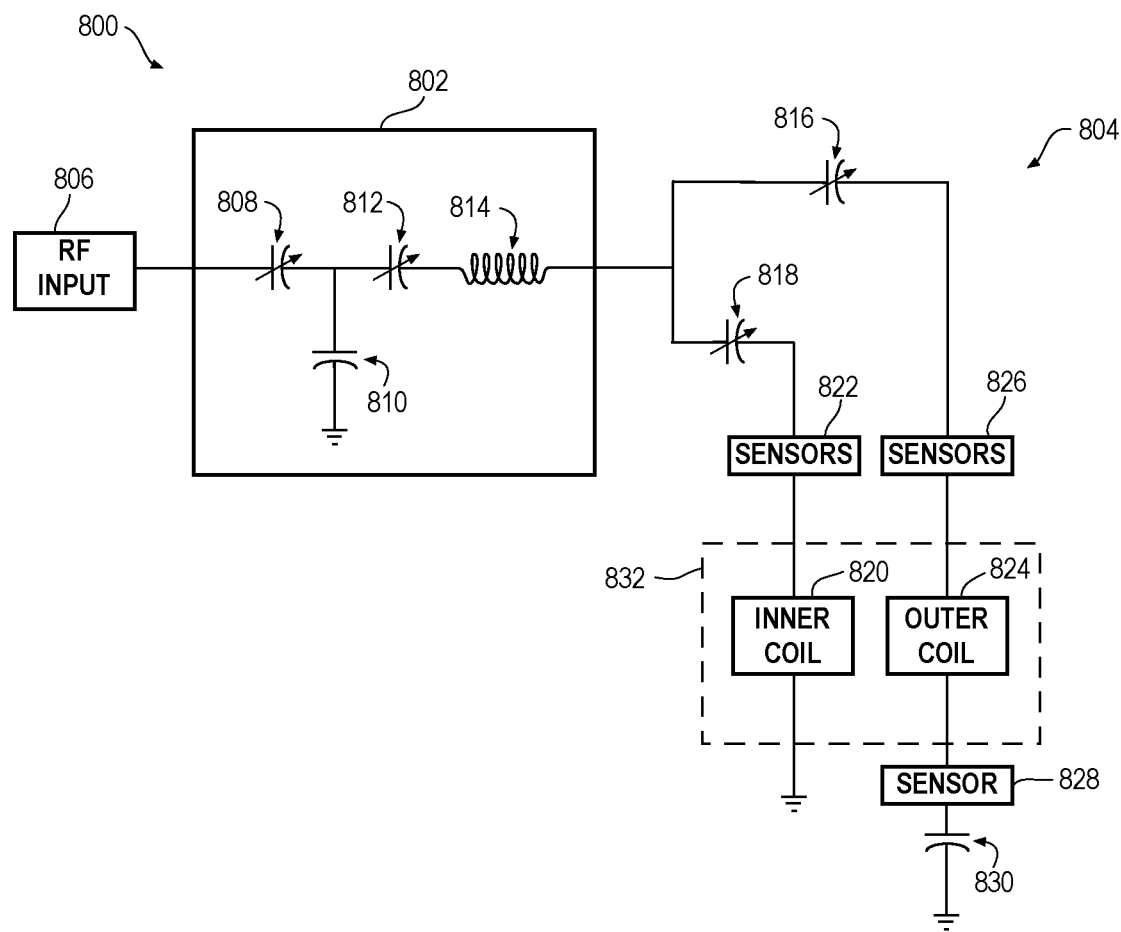
FIG. 7. a schematic representation of a matching network including coaxial variable capacitors according to one or more examples.

In the example of FIGS. 2 and 3A-3D, flexible structure 142 is coupled at one end to a first mounting annulus 148 on the underside of top conductive collar 106, and at an opposing end to an upper surface 150 of capacitor plate assembly 122. Flexible structure 144, which is coaxial and concentric with flexible structure 142, is coupled at one end to a second mounting annulus 152 on the underside of top conductive collar 106, and at an opposing end to a cylindrical piston structure 154, which is coupled to threaded actuator 115. Flexible structure 146, which is coaxial and concentric with flexible structures 142 and 144, is coupled at one end to a third mounting annulus 156 and at an opposing end to an upper surface 158 of second capacitor plate assembly 124. FIG. 7 is an exploded, isometric view of coaxial flexible structures 142, 144, and 146 according to one or more examples.

As shown in FIGS. 3A-3D, actuator 114 extends through one or more bearings or gaskets 160 in actuator end cap 104 and through an aperture in conductive collar 106, extending partially into flexible structure 146. In one or more examples, actuator 114 threadably engages a thrust collar 154.

With continued reference to FIGS. 2, 3A-3D, and 4, sealed volume 166 is defined within enclosure 102. In particular, with reference especially to FIGS. 3 and 4, (Multiple reference numerals 166 appear in FIGS. 3A-3D to indicate the extent of sealed volume 166).

In examples, certain regions within enclosure 102 may be at or near external, atmospheric pressure, due to a possibly nominal seal between actuator 114 and bearings or gaskets 160 where actuator 114 enters actuator end cap 104. On the other hand, sealed volume 166 is hermetically (i.e., vacuum- and liquid-tight) sealed, due to sealed attachment of flexible structures 142, 144, and 146 to top conductive collar 106 and to first capacitor plate assembly 122, piston structure 154, and second capacitor plate assembly 124, as previously described.

According to the present examples, the extent of interdigitated overlapping of first capacitor plate assembly 122 with third capacitor plate assembly 128, and hence the effective capacitance of the pair of capacitor plate assemblies 122 and 128 may be adjusted through rotation of actuator 114. Similarly, the extent of interdigitated overlapping of second capacitor plate assembly 124 with fourth capacitor plate assembly 130, and hence the effective capacitance of the pair of capacitor plate assemblies 124 and 130 may be adjusted through rotation of threaded actuator 115. Rotation of actuator 114, such as by a stepper motor or servo-motor (not shown) causes threads of actuator 114 to raise or lower thrust collar 162 and extended coupling 164, thereby raising or lowering movable capacitor plate assembly 118 relative to fixed capacitor plate assembly 120. Rotation of threaded actuator 115, such as with a belt, a stepper motor, or otherwise, causes threaded actuator 155 to raise or lower.

In examples, flexible structures 142, 144, and 146, extended coupling 164, thrust collar 162, and piston structure 154 are conductive (e.g., metallic) and provide a low-resistance electrical conduction path between first capacitor plate assembly 122, second capacitor plate assembly 124, top conductive collar 106, and threaded actuator 115. As previously described a bottom face 129 of third capacitor plate assembly 128 serves as another contact for coaxial variable capacitor 100, and a bottom face 131 of fourth capacitor plate assembly 130 serves as another contact of coaxial variable capacitor 100.

In various examples, a coaxial variable capacitor as described herein may achieve a high-power density, current handling capability, and high voltage handling capability within a small volume. Having multiple (two or more) pairs of capacitor plates, such as the interdigitated cylindrical blades as described herein, maintains high voltage breakdown for the variable capacitor, along with high current handling capability without additional volume being taken up with dielectrics of vacuum mechanics. The coaxial symmetry maximizes volume efficiency, and allows all electrode assemblies to be sealed (e.g., brazed) to one structure. In some examples, the brazing of internal components may be performed in one step.

One or more vacuum variable capacitors such as the vacuum variable capacitors from the examples of FIGS. 1-7 herein may be utilized for tuning and otherwise controlling matching networks in radio frequency plasma processing devices. RF plasma-enhanced processing is extensively used in semiconductor manufacturing to etch different types of films, deposit thin films at low to intermediate processing temperatures, and perform surface treatment and cleaning. One characteristic of such processes is the employment of a plasma, i.e., a partially ionized gas, that is used to generate neutral species and ions from precursors inside a reaction chamber, provide energy for ion bombardment, and/or perform other actions. Radio frequency plasma-enhanced processing is performed by what are known as radio frequency processing devices.

Radio frequency processing devices may include a radio frequency generator that transmits a signal to a plasma reaction chamber. A radio frequency matching device, which may have a variable impedance, may be located between the radio frequency generator and the plasma reaction chamber. The radio frequency matching device may be controlled, or otherwise tuned by varying the impedance of the radio frequency matching device. Tuning the radio frequency matching device reduces reflected power from the plasma reaction chamber and/or the radio frequency matching device, which may increase power that is transferred from the radio frequency generator to the plasma reaction chamber and into the plasma process. During operation, a radio frequency generator may be energized to form a plasma within a reaction chamber. The plasma may be produced after a source gas is injected into the reaction chamber and power is supplied within the reaction chamber by the radio frequency generator.

Under certain conditions, the power that is supplied to the reaction chamber may be reflected back from the reaction chamber. One cause of the reflected power may be a mismatch in the characteristic impedance of the system and the load formed by the plasma within the reaction chamber. To help prevent reflected power, a matching network may be disposed between the radio frequency generator and the reaction chamber. Such matching networks may include a number of variable capacitors or other impedance elements. The variable capacitors may be tuned so that the complex load impedance within the reaction chamber matches the impedance of the radio frequency generator.

While multiple methods of controlling or otherwise tuning matching networks have been used, such methods may not reliably and efficiently result in impedance matching. Matching networks may include stepper motors, which have a specific number of steps that are a function unique to a particular stepper motor. During operation, a capacitor may be driven by a motor that has a range between zero and one hundred percent and the motor may, as a result, have a number of clicks. Embodiments of the present disclosure may provide recipes and/or otherwise allow for the adjustment of a capacitor position based, at least in part, on "a steps to percent ratio."

Turning to FIG. 8, a schematic representation of a matching network including variable capacitors (which may include variable capacitor 100 as discussed above) according to one or more examples is shown. In example of FIG. 8, a matching network 800 is illustrated having a matching branch 802 and a splitter branch 804. Matching branch 802 receives radio frequency power from a radio-frequency (RF) input 806. A first variable capacitor 808 of the matching branch 802 receives RF power from RF input 806. First variable capacitor 808 may be a variable capacitor such as that disclosed herein with reference to FIGS. 1-7, and may be rated at approximately 10-2000 pF.

In the example of FIG. 8, first variable capacitor 808 is connected to a second capacitor 810, which is connected to ground. Second capacitor 810 is also connected to a third variable capacitor 812. Third variable capacitor 812 may also be a variable capacitor such as that disclosed herein with reference to FIGS. 1-7 and may be rated at approximately 10-2000 pF. Third variable capacitor 812 is also connected to an inductor 814, which further connects to splitter branch 804.

Splitter branch 804 receives RF power from matching branch 802, which, splits the received RF power between a fourth variable capacitor 816 and a fifth variable capacitor 818. Fourth variable capacitor 816 and fifth variable capacitor 818 may also be variable capacitors such as that disclosed herein with reference to FIGS. 1-7 and may be rated at approximately 10-2000 pF.

Fifth variable capacitor 818 is connected to an inner coil 820. Between fifth variable capacitor 818 and inner coil 820, one or more sensors 822 may be disposed. Sensor(s) 822 may be used to measure, for example, voltage between fifth variable capacitor 818 and ground. Similarly, fourth variable capacitor 816 is connected to an outer coil 824. Between fourth variable capacitor 816 and outer coil 824, one or more sensors 826 may be disposed. Sensors 826 may be used to measure, for example, voltage between fourth variable capacitor 816 and ground.

Inner coil 820 may further be connected to a ground and outer coil 824 may be connected to circuitry that includes a sensor 828 and a sixth capacitor 830. Sensor 828 may be used to measure, for example, voltage between outer coil 824 and ground. Inner coil 820 and outer coil 824 may be located outside of the matching network 800 circuitry, as indicated by dashed line 832 in FIG. 8.

The circuitry illustrated in FIG. 8 may be used to tune first variable capacitor 808, third variable capacitor 812, fourth variable capacitor 816, and fifth variable capacitor 818. By tuning first variable capacitor 808, third variable capacitor 812, fourth variable capacitor 816, and fifth variable capacitor 818, the power provided to inner coil 820 and outer coil 824 may be adjusted.

The circuitry, which in one embodiment may be employed in matching network 800 as a current split ratio matching network, may be controlled using a programmable logic controller (not shown), which may be disposed in or otherwise connected to matching network 800.

The foregoing description, for purposes of explanation, uses specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. Examples herein are not intended to be exhaustive of or to limit this disclosure to the precise forms described. Many modifications and variations are possible in view of the above teachings.

For example, although implementations are described herein incorporating two coaxial capacitor plate pairs, it is contemplated that in other examples, more than two coaxial plate pairs may be incorporated. Furthermore, although examples described herein involve two or more movable coaxial plates moving simultaneously with respect to two or more fixed coaxial plates, it is contemplated that in other examples, one or more of the coaxial plates may be advanced or retracted independently of others.

The examples herein are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A variable capacitor, comprising:
    an enclosure having an interior, a top conductive collar and a bottom contact assembly electrically separated by a cylindrical insulator;
    a first movable capacitor plate assembly disposed in the interior of the enclosure, the first movable capacitor plate assembly including a first capacitor plate;
    a second movable capacitor plate assembly disposed in the interior of the enclosure, the second movable capacitor plate assembly including a second capacitor plate;
    a first flexible structure having a first end sealed to the top conductive collar and a second end sealed to the first movable capacitor plate assembly;
    a second flexible structure, coaxial with and surrounding the first flexible structure and having a first end sealed to the top conductive collar and a second end sealed to the second movable capacitor plate assembly;
    a third flexible structure, coaxial with and surrounding the first and second flexible structures and having a first end sealed to the top conductive collar and a second end sealed to the second movable capacitor plate assembly;
    a first fixed capacitor plate assembly disposed proximal to the first movable capacitor plate assembly, the first fixed capacitor plate assembly including a third capacitor plate;
    a second fixed capacitor plate assembly disposed proximal to the second movable capacitor plate assembly, the second fixed capacitor plate assembly including fourth capacitor plate;
    a first actuator extending through the top conductive collar and through the first flexible structure, a distal end of the actuator engaging with a thrust collar, the first actuator for advancing and retracting the first movable capacitor plate assembly with respect to the first fixed capacitor plate assembly; and
    a second actuator extending through the top conductive collar, the second actuator coupled to a piston structure, the second actuator for advancing and retracting the second piston structure to advance and retract the second movable capacitor plate assembly with respect to the second fixed capacitor plate assembly;
    wherein the first and third capacitor plates comprise an interdigitated plurality of concentric cylindrical plates, and the second and fourth capacitor plates comprise an interdigitated plurality of concentric cylindrical plates.

2. The variable capacitor of claim 1, wherein the first actuator includes threads for engaging the thrust collar, such that rotation of the actuator in a first direction advances the first movable capacitor plate assembly toward the first fixed capacitor plate assembly and expanding the first flexible structure, and rotation of the first actuator in a second direction retracts the first movable capacitor plate assembly away from the first fixed capacitor plate assembly and contracting the first flexible structure.

3. The variable capacitor of claim 2, wherein when the second actuator is advanced into the enclosure, the second movable capacitor plate assembly is advanced toward the second fixed capacitor plate and the second and third flexible structures are expanded, and when the second actuator is retracted outwardly from the enclosure, the second movable capacitor plate assembly is retracted away from the second fixed capacitor plate and the second and third flexible structures are contracted.

4. The variable capacitor of claim 1, wherein first, second and third flexible structures comprise bellows structures.

5. The variable capacitor of claim 1, wherein the first, second, third and fourth capacitor plates each comprise a plurality of concentric cylindrical plates having a constant height.

6. The variable capacitor of claim 1, wherein at least the first and second capacitor plates each comprise a cylindrical coil having a greater height at a center portion thereof, and a lower height at an outer portion thereof.

7. The variable capacitor of claim 1, wherein the first, second, third, and fourth capacitor plates each comprise a plurality of folded, concentric plates each having a conical cross section, the peaks of which being interdigitated to varying extents depending upon the advancement and retraction of the movable capacitor plate assemblies.

8. The variable capacitor of claim 5, wherein the advancing and retracting of the first movable capacitor assembly varies the extent of overlapping interdigitation of the first capacitor plate with the third capacitor plate;
    and wherein the advancing and retracting of the second movable capacitor plate assembly varies the extent of overlapping interdigitation of the second capacitor plate with the fourth capacitor plate.

9. The variable capacitor of claim 3, further comprising:
    a bottom contact assembly including an outer conductive ring,
    an inner conductive ring,
    an insulator ring separating the outer conductive ring and the inner conductive ring; and
    an intermediate electrically insulating element separating the first conductive collar and the bottom contact assembly;
    wherein the inner conductive ring is in electrical contact with the third capacitor plate, and the outer conductive ring is in in electrical contact with the fourth capacitor plate.

10. The variable capacitor of claim 9, wherein the first, second, and third flexible structures provide conductive connections between the movable capacitor plate assemblies and the first conductive collar.

11. The variable capacitor of claim 1, wherein a vacuum is maintained within the interior of the enclosure.

12. The variable capacitor of claim 1, wherein a liquid dielectric is contained within the interior of the enclosure.

13. A method of adjusting capacitance of a variable capacitor, comprising:
    providing an enclosure having an interior, a top conductive collar and a bottom contact assembly electrically separated by a cylindrical insulator;
    providing a first movable capacitor plate assembly disposed in the interior of the enclosure, the first movable capacitor plate assembly including a first capacitor plate;
    providing a second movable capacitor plate assembly disposed in the interior of the enclosure, the second movable capacitor plate assembly including a second capacitor plate;
    providing a first flexible structure having a first end sealed to the top conductive collar and a second end sealed to the first movable capacitor plate assembly;
    providing second flexible structure, coaxial with and surrounding the first flexible structure and having a first end sealed to the top conductive collar and a second end sealed to the second movable capacitor plate assembly;
    providing a third flexible structure, coaxial with and surrounding the first and second flexible structures and having a first end sealed to the top conductive collar and a second end sealed to the second movable capacitor plate assembly;

providing a first fixed capacitor plate assembly disposed proximal to the first movable capacitor plate assembly, the first fixed capacitor plate assembly including a third capacitor plate;

providing a second fixed capacitor plate assembly disposed proximal to the second movable capacitor plate assembly, the second fixed capacitor plate assembly including fourth capacitor plate;

providing a first actuator extending through the top conductive collar and through the first flexible structure, a distal end of the actuator engaging with a thrust collar, the first actuator for advancing and retracting the first movable capacitor plate assembly with respect to the fixed capacitor plate assembly; and providing a second actuator extending through the top conductive collar, the second actuator coupled via a piston structure to the second movable capacitor plate assembly, the second actuator for advancing and retracting the second movable capacitor plate assembly;

wherein:

the first and third capacitor plates comprise an interdigitated plurality of concentric cylindrical plates, and the second and fourth capacitor plates comprise an interdigitated plurality of concentric cylindrical plates; and actuating the first actuator to adjust the capacitance between the first and third capacitor plates, and actuating the second actuator to adjust the capacitance between the second and fourth capacitor plates.

14. The method of claim 13, wherein the first actuator includes threads for engaging the actuator thrust collar, such that rotation of the actuator in a first direction advances the first movable capacitor plate assembly toward the first fixed capacitor plate assembly and expanding the first flexible structure, and rotation of the threaded actuator in a second direction retracts the first movable capacitor plate assembly away from the first fixed capacitor plate assembly and contracting the first flexible structure.

15. The method of claim 14, wherein when the second actuator is advanced into the enclosure, the second movable capacitor plate assembly is advanced toward the second fixed capacitor plate and the second and third flexible structures are expanded, and when the second actuator is retracted outwardly from the enclosure, the second movable capacitor plate assembly is retracted away from the second fixed capacitor plate and the second and third flexible structures are contracted.

16. The method of claim 13, wherein first, second and third flexible structures comprise bellows structures.

17. The method of claim 13, wherein the independent advancing and retracting of the movable capacitor assemblies independently varies the extent of overlapping interdigitation between the first movable capacitor plate assembly and the first fixed capacitor plate assembly, and between the second movable capacitor plate assembly and the second fixed capacitor plate assembly.

18. The method of claim 17, further comprising providing a top conductive collar in electrical contact with the movable capacitor plate assembly, a contact assembly in electrical contact with the fixed capacitor plate assembly, and an intermediate electrically insulating element separating the first conductive collar and the second conductive collar.

19. The method of claim 18, wherein at least one of the first, second, and third flexible structures provide conductive connections between the movable capacitor plate assemblies and the top conductive collar.

20. The method of claim 13, further comprising providing a liquid dielectric in the interior of the enclosure.

21. The method of claim 13, further comprising maintaining a vacuum in the interior of the enclosure.

* * * * *